US010129952B2

(12) United States Patent
Jayawardena et al.

(10) Patent No.: US 10,129,952 B2
(45) Date of Patent: Nov. 13, 2018

(54) OUTPUT ADJUSTMENT OF A LIGHT FIXTURE IN RESPONSE TO ENVIRONMENTAL CONDITIONS

(71) Applicants: Adikaramge Asiri Jayawardena, Manlius, NY (US); Joseph Michael Manahan, Manlius, NY (US); Richard E. Rothenberger, Syracuse, NY (US); John M. Bonaccio, DeWitt, NY (US)

(72) Inventors: Adikaramge Asiri Jayawardena, Manlius, NY (US); Joseph Michael Manahan, Manlius, NY (US); Richard E. Rothenberger, Syracuse, NY (US); John M. Bonaccio, DeWitt, NY (US)

(73) Assignee: Cooper Technologies Company, Houston, TX (US)

( * ) Notice: Subject to any disclaimer, the term of this patent is extended or adjusted under 35 U.S.C. 154(b) by 25 days.

(21) Appl. No.: 14/854,807

(22) Filed: Sep. 15, 2015

(65) Prior Publication Data
US 2017/0079117 A1    Mar. 16, 2017

(51) Int. Cl.
H05B 37/02    (2006.01)
H05B 33/08    (2006.01)

(52) U.S. Cl.
CPC ..... *H05B 37/0227* (2013.01); *H05B 33/0872* (2013.01); *H05B 37/0245* (2013.01); *H05B 37/0272* (2013.01)

(58) Field of Classification Search
None
See application file for complete search history.

(56) References Cited

U.S. PATENT DOCUMENTS

| 5,815,072 | A | 9/1998 | Yamanaka et al. | |
| 7,204,622 | B2* | 4/2007 | Dowling | H05B 33/0842 |
| | | | | 362/147 |
| 7,697,925 | B1* | 4/2010 | Wilson | H04M 1/22 |
| | | | | 455/418 |
| 8,035,320 | B2* | 10/2011 | Sibert | H05B 37/0245 |
| | | | | 315/149 |
| 8,203,524 | B2 | 6/2012 | Yoshida et al. | |
| 8,403,523 | B2 | 3/2013 | Gerlach et al. | |
| 8,581,507 | B2 | 11/2013 | Corradi | |
| 8,723,450 | B2 | 5/2014 | Hatley et al. | |
| 8,742,680 | B2 | 6/2014 | Cowburn | |
| 8,884,530 | B2 | 11/2014 | Lee | |

(Continued)

FOREIGN PATENT DOCUMENTS

DE    202014104294 U1    1/2015
RU         87780         10/2009

OTHER PUBLICATIONS

G. Tarakonova, International Search Report and Written Opinion issued in application No. PCT/US2016/051691, completion date Dec. 21, 2016, dated Jan. 26, 2017, 7 pages, Federal Institute of Industrial Property, Moscow, Russia.

(Continued)

*Primary Examiner* — Crystal L Hammond
(74) *Attorney, Agent, or Firm* — King & Spalding LLP

(57) ABSTRACT

A light fixture is described herein. The light fixture can include at least one light source. The light fixture can also include a controller coupled to the at least one light source, where the controller controls an output of the at least one light source based on a location of the light fixture in a facility.

20 Claims, 6 Drawing Sheets

(56) References Cited

U.S. PATENT DOCUMENTS

| | | | |
|---|---|---|---|
| 8,890,437 B2 | 11/2014 | Chakravarti et al. | |
| 9,572,226 B2 * | 2/2017 | Motley | H05B 37/02 |
| 9,723,696 B2 * | 8/2017 | Carrigan | H05B 37/0272 |
| 2003/0057887 A1 * | 3/2003 | Dowling | H05B 37/029 |
| | | | 315/291 |
| 2005/0024488 A1 * | 2/2005 | Borg | G06Q 30/06 |
| | | | 348/36 |
| 2006/0002110 A1 * | 1/2006 | Dowling | F21K 9/00 |
| | | | 362/249.05 |
| 2006/0022214 A1 * | 2/2006 | Morgan | F21K 9/00 |
| | | | 257/99 |
| 2009/0315485 A1 | 12/2009 | Verfuerth et al. | |
| 2011/0187290 A1 | 8/2011 | Krause | |
| 2011/0199004 A1 | 8/2011 | Henig et al. | |
| 2012/0032599 A1 | 2/2012 | Mohan et al. | |
| 2012/0134155 A1 | 5/2012 | Wendt et al. | |
| 2013/0229113 A1 | 9/2013 | Toda et al. | |
| 2013/0293877 A1 * | 11/2013 | Ramer | H05B 33/0842 |
| | | | 356/213 |
| 2014/0001963 A1 * | 1/2014 | Chobot | H05B 37/02 |
| | | | 315/153 |
| 2014/0035482 A1 * | 2/2014 | Rains, Jr. | H05B 37/0254 |
| | | | 315/294 |
| 2014/0273811 A1 * | 9/2014 | Czapla | H04H 20/61 |
| | | | 455/3.06 |
| 2014/0354153 A1 * | 12/2014 | Pulido, Jr. | H05B 33/0854 |
| | | | 315/77 |
| 2015/0012308 A1 * | 1/2015 | Snyder | H04W 84/18 |
| | | | 705/5 |
| 2015/0156745 A1 * | 6/2015 | Shcheglov | G01S 1/70 |
| | | | 455/456.1 |
| 2016/0203663 A1 * | 7/2016 | Proctor | G07C 9/00111 |
| | | | 345/8 |
| 2016/0212449 A1 * | 7/2016 | Satin | H04N 21/4788 |
| 2016/0227628 A1 * | 8/2016 | Lydecker | H05B 37/0227 |
| 2016/0234916 A1 * | 8/2016 | Mans | H05B 37/0227 |
| 2017/0094753 A1 * | 3/2017 | Lunn | H05B 37/0227 |

OTHER PUBLICATIONS

Machine translation of RU87780 Abstract, via Lexis Nexis Total Patents, Feb. 27, 2017, 1 page.

* cited by examiner

OUTPUT ADJUSTMENT OF A LIGHT FIXTURE IN RESPONSE TO ENVIRONMENTAL CONDITIONS

TECHNICAL FIELD

The present disclosure relates generally to light fixtures, and more particularly to systems, methods, and devices for adjusting the output of light fixtures based on environmental conditions.

BACKGROUND

Light fixtures are used to provide illumination from a light source to allow people in the proximity of the light fixtures to see. These light fixtures can be located indoors or outdoors. These light fixtures can be located in residential, commercial, or industrial settings. These light fixtures can be located in any of a number of environments (e.g., hazardous locations). Further, these light fixtures can be located at any height relative to where a person is located.

SUMMARY

In general, in one aspect, the disclosure relates to a light fixture. The light fixture can include at least one light source. The light fixture can also include a controller coupled to the at least one light source, where the controller controls an output of the at least one light source based on a location of the light fixture in a facility.

In another aspect, the disclosure can generally relate to a controller of a light fixture. The controller can include memory having a number of instructions that correspond to at least one environmental condition associated with a location in which the light fixture is disposed. The controller can also include a control engine coupled to the memory, where the control engine is configured to control an output of at least one light source of the light fixture based on the instructions.

In yet another aspect, the disclosure can generally relate to an electrical system. The electrical system can include a first light fixture. The first light fixture can include at least one first light source. The first light fixture can also include a first controller coupled to the at least one first light source, where the first controller controls a first light output of the at least one first light source based on a first location of the first light fixture in a facility.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
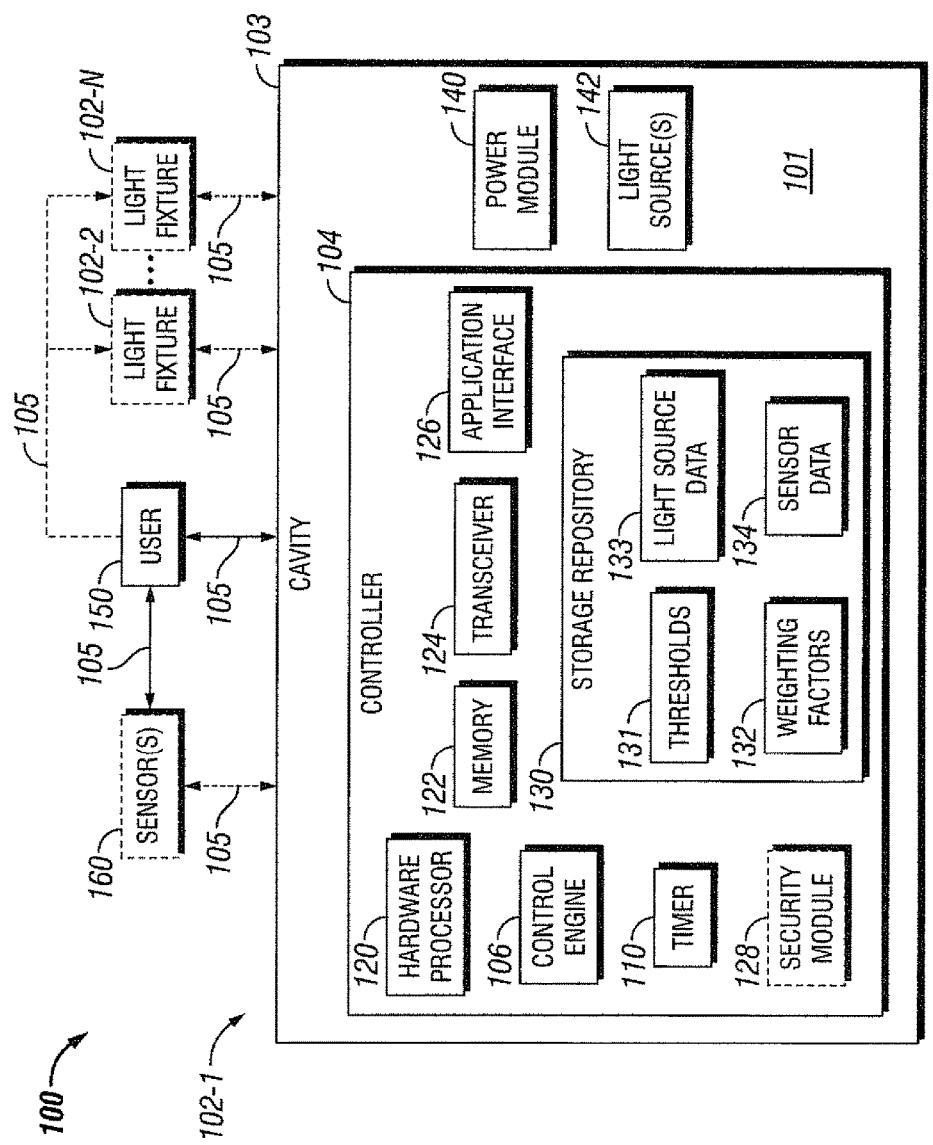
FIG. 1 shows a system diagram of a lighting system that includes a light fixture in accordance with certain example embodiments.

In general, example embodiments provide systems, methods, and devices for adjusting the output (e.g., intensity, spectral output) of light fixtures based on environmental conditions. Example embodiments of adjusting the output of light fixtures based on environmental conditions provide a number of benefits. Such benefits can include, but are not limited to, enhanced communication using light fixtures within a facility, communication of certain conditions within or proximate to a facility, communication of a location within a facility, improved safety, user configurability, ease of maintenance, and compliance with industry standards and/or government regulations that apply to electrical enclosures (e.g., light fixtures, sensor devices) located in certain environments.

As used herein, an environmental condition (also sometimes referred to as a designated environment herein) can be any type of location and/or other designation, whether permanent or temporary, in which a light source is disposed. For example, an environmental condition can be a classification (e.g., Class 1, Class 2, Division 1) of an area in which a light fixture is disposed. As another example, an environmental condition can be an event that occurs in, or proximate to, an area in which a light fixture is located. An environmental condition can be static or dynamic, and an environmental condition can be predictive or unpredictable. Examples of such an event can include, but are not limited to, a gas leak, a fire, an equipment failure, a power outage, and an accident. As yet another example, an environmental condition can be a condition in, or proximate to, an area in which a light fixture is disposed. Examples of such a condition can include, but are not limited to, a weather condition (e.g., snow, fog, rain, high winds), bird migration season, turtle hatching season, presence of wildlife, and falcon nesting season.

Example embodiments, or portions thereof, can be disposed in a facility. As used herein a facility can be an indoor space or an outdoor space. A facility can be a building, a room, a yard, a parking lot, a parking garage, a warehouse, a storage shed, a retention pond, or any of a number of other suitable locations in which example embodiments can be used. In addition, or in the alternative, example embodiments (or portions thereof) can be exposed to one or more of any of a number of conditions. Such conditions can include, but are not limited to, humidity, wind speed, high temperatures, low temperatures, vibrations, noise, and corrosion.

In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. A user may be any person that interacts with example light fixtures that can be adjusted based on environmental conditions.

Examples of a user may include, but are not limited to, an engineer, an electrician, an instrumentation and controls technician, a mechanic, an operator, a consultant, a contractor, and a manufacturer's representative.

The example light fixtures that can be adjusted based on environmental conditions (or components thereof, including controllers) described herein can be made of one or more of a number of suitable materials to allow the light fixture and/or other associated components of a system to meet certain standards and/or regulations while also maintaining durability in view of the one or more conditions under which the light fixtures and/or other associated components of the system can be exposed. Examples of such materials can include, but are not limited to, aluminum, stainless steel, fiberglass, glass, plastic, ceramic, and rubber.

Example light fixtures that can be adjusted based on environmental conditions, or portions thereof, described herein can be made from a single piece (as from a mold, injection mold, die cast, or extrusion process). In addition, or in the alternative, example embodiments of adjusting the output of light fixtures based on environmental conditions can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removably, slidably, and threadably.

In the foregoing figures showing example embodiments of light fixtures that can be adjusted based on environmental conditions, one or more of the components shown may be omitted, repeated, and/or substituted. Accordingly, example embodiments of light fixtures that can be adjusted based on environmental conditions should not be considered limited to the specific arrangements of components shown in any of the figures. For example, features shown in one or more figures or described with respect to one embodiment can be applied to another embodiment associated with a different figure or description.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In certain example embodiments, light fixtures that can be adjusted based on environmental conditions are subject to meeting certain standards and/or requirements. For example, the National Electric Code (NEC), the National Electrical Manufacturers Association (NEMA), the International Electrotechnical Commission (IEC), Underwriters Laboratories (UL), and the Institute of Electrical and Electronics Engineers (IEEE) set standards as to electrical enclosures, wiring, and electrical connections. As another example, the Occupational Safety and Health Administration (OSHA) enforces compliance of area classifications in the United States. Use of example embodiments described herein comply with (and/or allow a corresponding device to comply with) such standards when required. In some (e.g., PV solar) applications, additional standards particular to that application may be met by the electrical enclosures described herein.

Example embodiments of light fixtures that can be adjusted based on environmental conditions will be described more fully hereinafter with reference to the accompanying drawings, in which example embodiments of light fixtures that can be adjusted based on environmental conditions are shown. Light fixtures that can be adjusted based on environmental conditions may, however, be embodied in many different forms and should not be construed as limited to the example embodiments set forth herein. Rather, these example embodiments are provided so that this disclosure will be thorough and complete, and will fully convey the scope of light fixtures that can be adjusted based on environmental conditions to those of ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and are not meant to limit embodiments of light fixtures that can be adjusted based on environmental conditions. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a lighting system 100 that includes a light fixture 102-1 in accordance with certain example embodiments. The lighting system 100 can include a user 150, and a light fixture 102-1. Optionally, the lighting system can also include one or more sensors 160 and one or more other light fixtures (e.g., light fixture 102-2, light fixture 102-N). The light fixture 102-1 can include a controller 104, a power module 140, and one or more light sources 142. The controller 104 can include one or more of a number of components. Such components, can include, but are not limited to, a control engine 106, a timer 110, a storage repository 130, a hardware processor 120, a memory 122, a transceiver 124, an application interface 126, and, optionally, a security module 128. The components shown in FIG. 1 are not exhaustive, and in some embodiments, one or more of the components shown in FIG. 1 may not be included in an example light fixture. Any component of the example light fixture 102-1 can be discrete or combined with one or more other components of the light fixture 102-1.

The user 150 is the same as a user defined above. The user 150 can use a user system (not shown), which may include a display (e.g., a GUI). The user 150 interacts with (e.g., sends data to, receives data from) the controller 104 of the light fixture 102-1 via the application interface 126 (described below). The user 150 can also interact with one or more of the sensors 160. Interaction between the user 150, the light fixture 102-1, and the sensors 160 is conducted using communication links 105. Each communication link 105 can include wired (e.g., Class 1 electrical cables, Class 2 electrical cables, electrical connectors) and/or wireless (e.g., Wi-Fi, visible light communication, cellular networking, Bluetooth) technology. For example, a communication link 105 can be (or include) one or more electrical conductors that are coupled to the housing 103 of the light fixture 102-1 and to a sensor 160. The communication link 105 can transmit signals (e.g., power signals, communication signals, control signals, data) between the light fixture 102-1, the user 150, one or more additional light fixtures 102, and/or one or more of the sensors 160.

The one or more optional sensors 160 can be any type of sensing device that measure one or more parameters. Put another way, a sensor 160 can take a sensor measurement of a condition in the facility. Examples of types of sensors 160 can include, but are not limited to, a passive infrared sensor, a photocell, a pressure sensor, an air flow monitor, a gas detector, a smoke alarm, a fire detector, and a resistance temperature detector. A parameter that can be measured by a sensor 160 can include, but is not limited to, motion, an amount of ambient light, a gas concentration (e.g., a ppm level), humidity, particle concentration, smoke density, a badge worn by a person, a component temperature, and an ambient temperature.

In some cases, the parameter or parameters measured by (the sensor measurements taken by) a sensor 160 can be used to operate one or more light fixture components 142 of the light fixture 102-1. Each sensor 160 can use one or more of a number of communication protocols. A sensor 160 can be located within or on the housing 103 of the light fixture 102-1. Alternatively, a sensor 160 can be located outside the housing 103 of the light fixture 102-1. A sensor 160 can take a sensor measurement at regular intervals, continuously, randomly, based on an instruction from the controller 104, based on an instruction from a user 150, based on the occurrence of a condition (e.g., a sensor measurement taken by another sensor), and/or some other suitable factor.

The user 150 and/or the sensors 160 can interact with the controller 104 of the light fixture 102-1 using the application interface 126 in accordance with one or more example embodiments. Specifically, the application interface 126 of the controller 104 receives data (e.g., information, communications, instructions) from and sends data (e.g., information, communications, instructions) to the user 150 and/or each sensor 160. The user 150 and/or each sensor 160 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, and/or the sensors 160 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 7.

Further, as discussed above, such a system can have corresponding software (e.g., user software, sensor software, controller software, master controller software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 100.

The light fixture 102-1 can be any type of light fixture, including but not limited to an industrial hi-bay fixture, an emergency exit sign, a spot light, a flood light, a pendant light, a parking lot light, a security light, a table lamp, and a low bay fixture. The light fixture 102-1 can include a housing 103. The housing 103 can include at least one wall that forms a cavity 101. In some cases, the housing can be designed to comply with any applicable standards so that the light fixture 102-1 can be located in a particular environment (e.g., a hazardous environment). For example, if the light fixture 102-1 is located in an explosive environment, the housing 103 can be explosion-proof. According to applicable industry standards, an explosion-proof enclosure is a Division 1 enclosure that is configured to contain an explosion that originates inside, or can propagate through, the enclosure.

Continuing with this example, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

For applications where the example light fixture 102-1 is a Division 2 enclosure, no flame paths are involved. Instead, the housing 103 of the light fixture 102-1 is constructed to limit the ingress of hazardous gas and/or prevent the contact of gas with either an arcing component or a surface inside the housing 103 having sufficiently high temperature to ignite the hazardous gas. In such a case, special heat sinking considerations must be employed to limit the temperature of heat-generating components (e.g., light sources 142, power module 140) located within the cavity 101 of the housing 103.

The housing 103 of the light fixture 102-1 can be used to house one or more components of the light fixture 102-1, including one or more components of the controller 104. For example, as shown in FIG. 1, the controller 104 (which in this case includes the control engine 106, the timer 110, the storage repository 130, the hardware processor 120, the memory 122, the transceiver 124, the application interface 126, and the optional security module 128), the power module 140, and the one or more light sources 142 can be disposed in the cavity 101 formed by the housing 103, or on the housing 103 itself. In alternative embodiments, any one or more of these or other components of the light fixture 102-1 can be disposed on the housing 103 and/or remotely from the housing 103.

The storage repository 130 can be a persistent storage device (or set of devices) that stores software and data used to assist the controller 104 in communicating with the user 150, one or more additional light fixtures 102, and one or more sensors 160 within the system 100. In one or more example embodiments, the storage repository 130 stores one or more thresholds 131, weighting factors 132, light source data 133, and sensor data 134. The thresholds 131 are values that represent a maximum or minimum amount of a certain parameter (e.g., relative humidity, temperature, pressure, air flow). The thresholds 131 stored in the storage repository 130 can be based on one or more of a number of factors, including but not limited to industry standards, reliability standards, manufacturer specifications, actual performance of a field device, user input, and maintenance history of a piece of equipment.

The weighting factors 132 can be formulas and/or algorithms that determine the spectral power distribution, intensity, temporal characteristics (e.g., flashing light) of light output by each light source 142 of the light fixture 102-1 based on a measurement from a sensor 160. In some cases, there can be weighting factors 132 for ranges of measurement from a sensor 160, and so a sensor reading can be associated with one of a number of weighting factors 132. The weighting factors 132 can also determine light output when multiple sensor readings are received at substantially the same time. In this way, the weighting factors 132 can determine the color and intensity of the light output of the light sources 142 that can effectively communicate to a user 150 the various conditions that exist in a location of the facility.

Light source data 133 can be any data associated with each light source 142 of the light fixture 102-1. Such data can include, but is not limited to, dominant wavelength of the light output of a light source 142, current dimming control signal level, power (e.g., voltage, current) information, source temperature, current health status, a manufacturer of the light source 142, colors that can be output by a light source 142, dimming capability of a light source 142, intermittent capabilities of a light source 142, and power requirements of a light source 142. Sensor data 134 can be any data associated with each sensor 160 that is communicably coupled to the controller 104. Such data can include, but is not limited to, a manufacturer of the sensor 160, a model number of the sensor 160, communication protocol of a sensor 160, power requirements of a sensor 160, current health status of a sensor 160, and measurement data taken by the sensor 160.

Examples of a storage repository 130 can include, but are not limited to, a database (or a number of databases), a file system, a hard drive, flash memory, embedded memory in a microcontroller or system on chip (SoC), some other form of solid state data storage, or any suitable combination thereof. The storage repository 130 can be located on multiple physical machines, each storing all or a portion of the thresholds 131, the weighting factors 132, the light source data 133, and/or the sensor data 134 according to some example embodiments. Each storage unit or device can be physically located in the same or in a different geographic location. The storage repository 130 can be located within a light fixture. The storage repository can be a centralized memory unit that controls multiple light fixtures.

The storage repository 130 can be operatively connected to the control engine 106. In one or more example embodiments, the control engine 106 includes functionality to communicate with the user 150 and the sensors 160 in the system 100. More specifically, the control engine 106 sends information to and/or receives information from the storage repository 130 in order to communicate with the user 150 and the sensors 160.

In certain example embodiments, the control engine 106 of the controller 104 controls the operation of one or more components (e.g., the timer 110, the transceiver 124) of the controller 104 and the light fixture 102-1. For example, the control engine 106 can put the power module 140 in "sleep" mode when the light sources 142 are off. In such a case, power consumed by the light fixture 102-1 is conserved by only enabling the power module 140 when the power module 140 is needed. As another example, the control engine 106 can direct the timer 110 when to provide a current time, to begin tracking a time period, and/or perform another function within the capability of the timer 110.

The control engine 106 of the controller 104 can provide control, communication, and/or other similar signals to the user 150, one or more of the light sources 142, and one or more of the sensors 160. Similarly, the control engine 106 can receive control, communication, and/or other similar signals from the user 150 one or more of the light sources 142, and one or more of the sensors 160. The control engine 106 can control each light source 142 automatically (for example, based on one or more weighting factors 132 stored in the control engine 106) and/or based on control, communication, and/or other similar signals received from another device through a communication link 105. The control engine 106 may include a printed circuit board, upon which the hardware processor 120 and/or one or more discrete components of the controller 104 are positioned.

In certain example embodiments, the control engine 106 of the controller 104 determines the location of the light fixture 102-1 in a facility. The location of the light fixture 102-1 in the facility can be determined by the control engine 106 in one or more of a number of ways. For example, a user 150 can send the location of the light fixture 102-1 in the facility to the control engine 106 using the application interface 126. As another example, the control engine 106 (or some other part of the controller 104) can include a global positioning system (GPS) or some similar component that provides a specific location of the light fixture 102-1 or storage of the global position upon commissioning of the light fixture 102-1. In such a case, the control engine 106 (or some other part of the controller 104) can also include a map of the facility, and so provide a location of the light fixture 102-1 in the facility.

In certain example embodiments, the control engine 106 of the controller 104 receives one or more sensor measurements (a form of data or information) from one or more sensors 160. The control engine 106 can receive a sensor measurement from a sensor 160 using the communication links 105. A sensor measurement can be a detection or measurement of some environmental condition in a facility. An environmental condition can be a an event or status in at least a portion of a facility that can be monitored or detected by a sensor 160. Examples of an environmental condition can include, but are not limited to, a fire, smoke, a gas leak, excessive heat, excessive cold, normal temperatures, high pressure, low pressure, normal pressure, high vibrations, overcurrent, overvoltage, a ground fault, a loss of power, and normal operations. An environmental condition can occur during unstable operating conditions (e.g., over temperature, vibration-induced fatigue failure, overcurrent), unsafe conditions (e.g., high levels of hazardous gas levels, fire, high smoke density), and/or normal operating conditions.

Thus, a sensor measurement can represent a detection or measure, made by a sensor 160, of the environmental condition. Examples of a sensor measurement can include, but are not limited to, a temperature, a pressure, an amount of vibration, a current, a voltage, an amount of a hazardous gas concentration, particle concentration of a hazardous gase, the detection of a gas or particle flow direction, motion, and the measurement of light levels. When the control engine 106 receives a sensor measurement, the control engine 106 can interpret and evaluate the sensor measurement. The identification and evaluation of a sensor measurement can be made using thresholds 131, sensor data 134, weighting factors 132, and/or any other information stored in the storage repository 130.

The control engine 106 of the controller 104 can also identify the sensor 160 from which the sensor measurement came. The control engine 106 can identify the sensor 160 from which a sensor measurement came in one or more of a number of ways. For example, the control engine 106 can identify the sensor 160 based on a particular communication link 105 used to transmit the sensor measurement. As another example, the control engine 106 can identify the sensor 160 based on an identifying code in the signal, sent by the sensor 160 to the controller 104, that includes the sensor measurement.

In certain example embodiments, the control engine 106 of the controller 104 can also control the output of one or more light sources 142. The control engine 106 can control the output of a light source 142 based on the identification and evaluation of a sensor measurement received from a sensor 160. The output of a light source 142 controlled by the control engine 106 can include color, intensity, temporal characteristics, and/or any other characteristics of light emitted by a light source 142.

For example, if a sensor 160 measures a temperature (a type of sensor measurement) of 155° F. and sends the sensor measurement to the control engine 106 of the controller 104 using the communication link 105, the control engine 106 also identify the specific sensor 160 sending the sensor measurement. Once the control engine 106 has the sensor measurement and has identified the sensor 160, the control engine 106 can use one or more items from the storage repository 130 to evaluate the sensor measurement. For example, the control engine 106 can use the thresholds 131 and the sensor data 134 to determine that any temperature read by the sensor 160 that is above 150° F. is considered dangerously high. The control engine 106 can then use the weighting factors 132 and the light source data 133 to send control signals to a light source 142 to emit a flashing red light at 5 Hz frequency. The control engine 106 can evaluate, for example, the absolute sensor data with an absolute threshold, the rate of change of sensor data with a predetermined rate of change, and/or certain pattern of sensor readings.

In certain example embodiments, the control engine 106 of the controller 104 can include an interface that enables the control engine 106 to communicate with one or more components (e.g., power module 140) of the light fixture 102-1. For example, if the power module 140 of the light fixture 102-1 operates under IEC Standard 62386, then the power module 140 can include a digital addressable lighting interface (DALI). In such a case, the control engine 106 can also include a DALI to enable communication with the power module 140 within the light fixture 102-1.

In certain example embodiments, the control engine 106 of the controller 104 can also communicate, using communication links 105, with one or more additional light fixtures 102 in a network of example light fixtures. In such a case, one light fixture 102-1 can broadly communicate a hazard that exists in a specific location in proximity to the light fixture 102-1 and distribute that information across any number (e.g., tens, hundreds, thousands) of light fixtures within a facility. An example of this capability is discussed below with respect to FIG. 9.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM). By using the control engine 106 as described herein, at least a portion (e.g., the control engine 106) of the controller 104 can always be on, while the remainder of the controller 104 and/or one or more light sources 142 can be in sleep mode when they are not being used.

The timer 110 of the controller 104 can track clock time, intervals of time, an amount of time, and/or any other measure of time. Further, the timer 110 can generate interrupts in timing and/or a sequence. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 104, based on some other condition or from some other component, or from any combination thereof.

The hardware processor 120 of the controller 104 executes software in accordance with one or more example embodiments. Specifically, the hardware processor 120 can execute software on the control engine 106 or any other portion of the controller 104, as well as software used by the user 150 and/or one or more of the sensors 160. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA). Using FPGAs and/or other similar devices known in the art allows the controller 104 (or portions thereof) to be programmable and function according to certain logic rules and thresholds without the use of a hardware processor. The controller 104 can be part of a new light fixture 102-1. Alternatively, the controller 104 can be retrofit into an existing light fixture. Similarly, the sensors 160 used with example embodiments can be existing sensors or new sensors.

The transceiver 124 of the controller 104 can send and/or receive control and/or communication signals. Specifically, the transceiver 124 can be used to transfer data between the controller 104 and the user 150 and/or the sensors 160. The transceiver 124 can use wired and/or wireless technology. The transceiver 124 can be configured in such a way that the control and/or communication signals sent and/or received by the transceiver 124 can be received and/or sent by another transceiver that is part of the user 150 and/or the sensors 160.

When the transceiver 124 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals. Further, any transceiver information for the user 150 and/or the sensors 160 can be part of the sensor data 134 (or similar areas) of the storage repository 130.

Optionally, in one or more example embodiments, the security module 128 secures interactions between the controller 104, the user 150 and/or the sensors 160. More specifically, the security module 128 authenticates communication from software based on security keys verifying the identity of the source of the communication. For example, user software may be associated with a security key enabling the software of the user 150 to interact with the controller 104 and/or the sensors 160. Further, the security module 128 can restrict receipt of information, requests for information, and/or access to information in some example embodiments.

If the light source 142 is a light-emitting diode (LED), the LED can be of one or more of a number of types of LED technology, including but not limited to discrete LEDs, LED arrays, chip-on-board LEDs, edge lit LED panels, and surface mounted LEDs. In addition, or in the alternative, the light source 142 can include, or be part of, a light engine or a light assembly, which can include a printed wiring board (PWB), a printed circuit board (PCB), a wiring board, or some similar component.

A light source 142 can emit light in one or more of a number of colors. A light source 142 (e.g., a LED) can be a standard color that emits light through a colored filter. Alternatively, a light source 142 can be dedicated phosphor converted "red" LED. As yet another alternative, the light source 142 can be a red-green-blue (RGB) LED with accompanying software configured to allow the light source 142 to emit one or more of a number of specific colors. In addition, or in the alternative, a light source 142 can emit light constantly, intermittently, or any combination thereof. Further, or in the alternative, a light source 142 can emit a constant amount of light or a variable amount of light (dimming). These characteristics and patterns of light emitted by a light source 142 can be controlled by the control engine 106 of the controller 104, as described above.

The light fixture 102-1 can also include one or more other devices and/or components typically found in a light fixture to allow the light fixture 102-1 to operate. Such other components can be electrical, electronic, mechanical, or any combination thereof. Examples of such other light fixture components can include, but are not limited to, a control module, a heat sink, an electrical conductor or electrical cable, a terminal block, a lens, a diffuser, a reflector, an air moving device, a baffle, a dimmer, and a circuit board.

The power module 140 of the light fixture 102-1 provides power to the controller 104, one or more of the light sources 142, and/or some other component of the light fixture 102-1. In some cases, the controller 104 can have its own power module. The power module 140 can include one or more of a number of single or multiple discrete components (e.g., transistor, diode, resistor), and/or a microprocessor. The power module 140 may include a printed circuit board, upon which the microprocessor and/or one or more discrete components are positioned.

The power module 140 can include one or more components (e.g., a transformer, a diode bridge, an inverter, a converter) that receives power (for example, through an electrical cable) from a source external to the light fixture 102-1 and generates power of a type (e.g., alternating current, direct current) and level (e.g., 12V, 24V, 120V) that can be used by the controller 104, the light sources 142, and/or one or more other components of the light fixture 102-1. In addition, or in the alternative, the power module 140 can be a source of power in itself. For example, the power module 140 can be a battery, a localized photovoltaic power system, or some other source of independent power.

In certain example embodiments, the power module 140 can also provide power and/or control signals, directly or indirectly, to one or more of the sensors 160. In such a case, the control engine 106 can direct the power generated by the power module 140 to the sensors 160. In this way, power can be conserved by sending power to the sensors 160 when those devices need power, as determined by the control engine 106.

Figure 2:
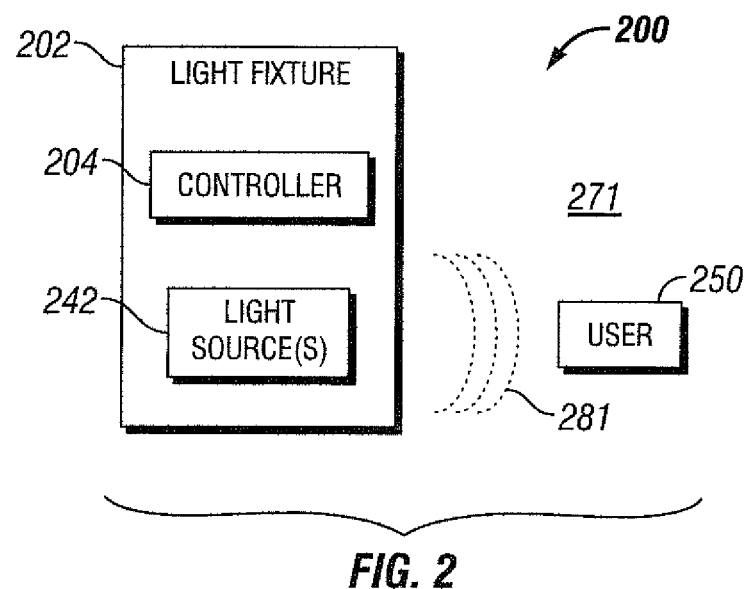
FIGS. 2 and 3 show system diagrams of a light fixture in accordance with certain example embodiments.
Figure 3:
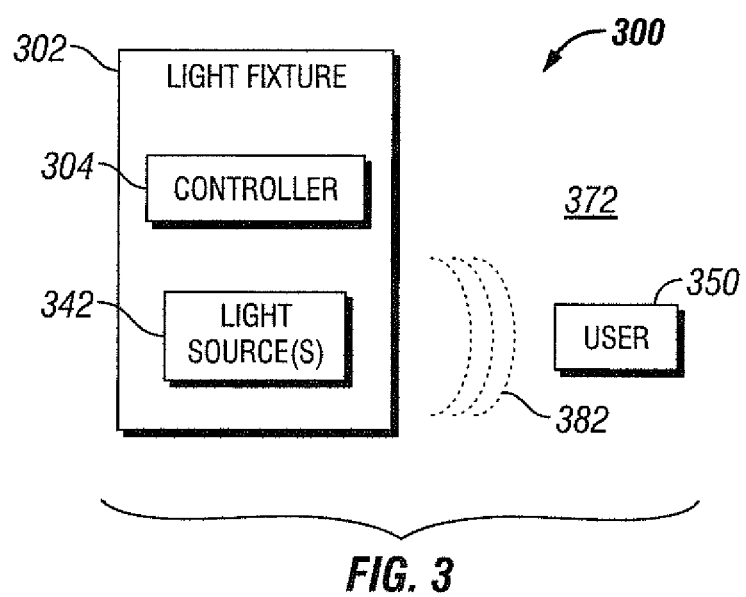

FIGS. 2 and 3 show system diagrams of a light fixture in accordance with certain example embodiments. Specifically, FIG. 2 shows a system 200 of a light fixture 202 located in a first location 271. FIG. 3 shows a system 300 of a light fixture 302 located in a second location 372. The light fixture 202 of FIG. 2 and the light fixture 302 of FIG. 3, including components thereof, can be substantially the same as the light fixture 102-1, including corresponding components, of FIG. 1. In this case, light fixture 202 and light fixture 302 do not include, and are not coupled to, a sensor (e.g., sensor 160).

Referring to FIGS. 1-3, the system 200 of FIG. 2 shows that the light fixture 202 includes a controller 204 and a light source 242. The controller 204 is configured to both control the light output 281 of the light source 242 and determine the location 271 of the light fixture 202. In this way, the controller 204 controls the light output 281 of the light source 242 based on the location 271 of the light fixture 202. For example, if the location 271 of the light fixture 202 is a work floor in a factory, the controller 204 can cause the light output 281 of the light fixture 202 to be constant and bright white light.

Similarly, the system 300 of FIG. 3 shows that the light fixture 302 includes a controller 304 and a light source 342. The controller 304 is configured to both control the light output 382 of the light source 342 and determine the location 372 of the light fixture 302. In this way, the controller 304 controls the light output 382 of the light source 342 based on the location 372 of the light fixture 302. For example, if the location 372 of the light fixture 302 is an entrance to a chemical storage area at an industrial facility, the controller 304 can cause the light output 382 of the light fixture 302 to be an intermittent (flashing) and soft blue light.

Figure 4:
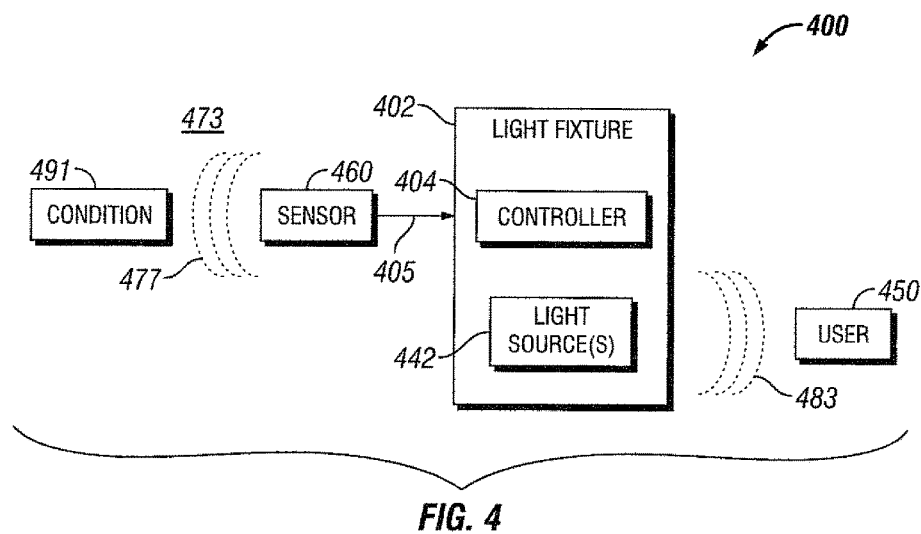
FIGS. 4-6 show additional system diagrams of a light fixture in accordance with certain example embodiments.
Figure 5:
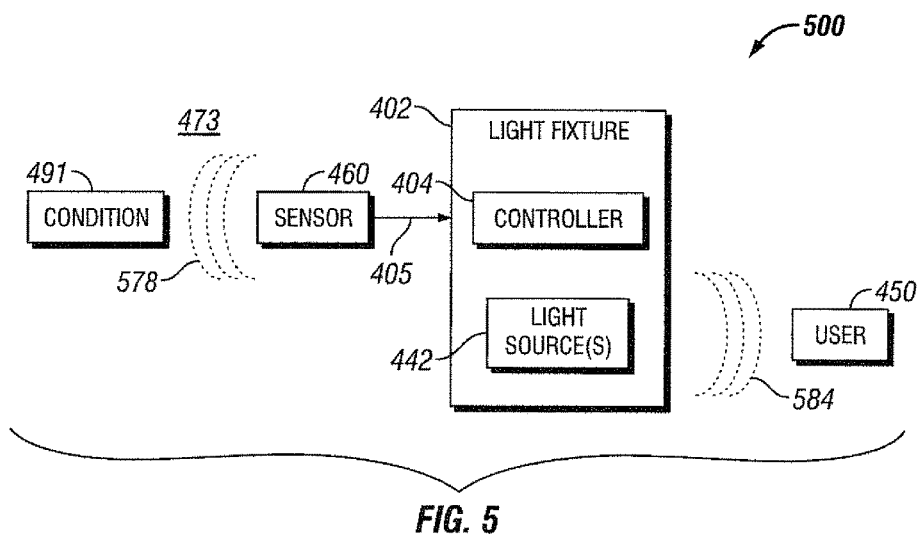
Figure 6:
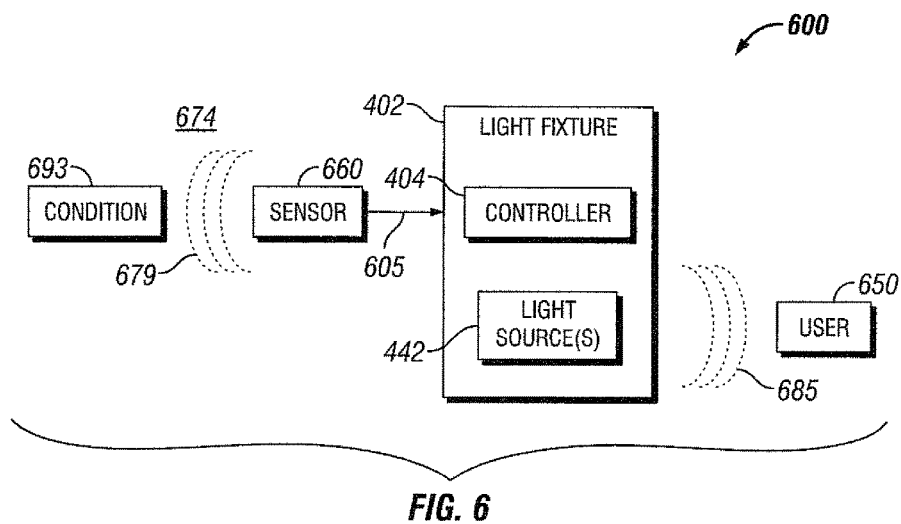

FIGS. 4-6 show additional system diagrams of a light fixture in accordance with certain example embodiments. Specifically, FIG. 4 shows a system 400 of a light fixture 402 located in a location 473 at a time when a first condition 491 occurs. FIG. 5 shows a system 500 of the light fixture 402 of FIG. 4 located in the location 473 at a time when a second condition 592 occurs. FIG. 6 shows a system 700 of the light fixture 402 of FIG. 4 located in the location 473 a time when a third condition 692 occurs. The light fixture 402 of FIGS. 4-6, including components thereof, can be substantially the same as the light fixture 102-1 of FIG. 1, including corresponding components thereof.

Referring to FIGS. 1-6, the system 400 of FIG. 4 shows that the light fixture 402 includes a controller 404 and a light source 442. The controller 404 (and more specifically, the control engine of the controller 404) is configured to both receive the sensor measurement 477 of sensor 460 and control the light output 483 of the light source 442. Specifically, the sensor 460 is disposed in a location 473 of the facility and takes a sensor measurement 477 of a condition 491. The sensor 460 sends the sensor measurement 477 to the controller 404 of the light fixture 402 using the communication link 405. In this example, the condition 491 is the presence of the hydrogen sulfide ($H_2S$) gas. In such a case, the sensor 460 can be a gas detector that measures the amount of $H_2S$ in the ambient air of the location 473, and so the sensor measurement 477 can include the amount of $H_2S$ measured by the sensor 460. In this case, the sensor measurement 477 of FIG. 4 can be 10 parts per million (ppm).

The light fixture 402 can also be located in the location 473 of the facility. Alternatively, the light fixture 402 can be located in another location (aside from location 473) of the facility. Once the controller 404 of the light fixture 402 receives the sensor measurement 477, the controller 404 (more specifically, the control engine of the controller 404) can interpret and evaluate the sensor measurement 477. The identification and evaluation of the sensor measurement 477 can be made using the thresholds, the sensor data, the weighting factors, and/or any other information stored in the storage repository of the controller 404. In this example, the controller 404 determines that the acceptable range of $H_2S$ is 0 ppm to 10 ppm, and so the sensor measurement 477 of 10 ppm is at the high end of an acceptable range.

Once the controller 404 of the light fixture 402 interprets and evaluates the sensor measurement 477, the controller 404 (specifically, the control engine of the controller 404) can control the light output 483 (or, more simply, the output 483) of one or more light sources 442 of the light fixture 402. The controller 404 can control the light output 483 of the light source 442 based on the identification and evaluation of the sensor measurement 477 received from the sensor 460. The light output 483 of the light source 442 controlled by the controller 404 can include color, brightness, dimming, intermittency, and/or any other characteristics of light emitted by the light source 442. In this example, the controller 404 directs the light source 442 to emit a light output 483 of a white light that continuously transitions to red light and back to white light every 10 seconds. The light output 483 of the light source 442 of the light fixture 402 is seen by a user 450.

In certain example embodiments, the controller 404 can send one or more signals to one or more other components (not shown) of the system 400. For example, the controller 404 can send a signal (using the transceiver of the controller 404, the application interface of the controller 404, and/or the communication links (e.g., communication link 405)) to a vent fan (or a controller of the vent fan) located in the location 473, where the signal starts and runs the vent fan at some speed. In such a case, the vent fan can circulate the air in the location 473 in an attempt to lower the concentration of $H_2S$ in the location 473. As discussed above, in some cases, the controller 404 can also determine the location of the light fixture 402 in the facility. In such a case, the location of the light fixture 402 can be a factor considered by the controller 404 as to what the light output 483 of the light source 442 should be.

The system 500 of FIG. 5 is substantially the same as the system 400 of FIG. 4, except as described below. Specifically, the system 500 of FIG. 5 shows that the condition 491 (the presence of $H_2S$ gas) is still being measured by the sensor 460, but at a different time than when the sensor measurement 477 of FIG. 4 was taken. In this case, the sensor measurement 578 of FIG. 5 is outside the range described above with respect to FIG. 4. For example, the sensor measurement 578 can be 450 ppm. As a result, the controller 404 directs the light source 442 to emit a light output 584 that is different than the light output 483 of FIG. 4. For example, in this case, the light output 584 can be red light that continuously flashes on and off, having intervals of 3 seconds being on and one second being off. The light output 584 of the light source 442 of the light fixture 402 is again seen by the user 450.

In this example, the controller 404 can also send a signal (using the transceiver of the controller 404, the application interface of the controller 404, and/or the communication links (e.g., communication link 405)) to a siren (or a controller of the siren), where the siren emits (e.g., continuously, intermittently) a sound that notifies one or more users 450 that the concentration of $H_2S$ gas in the location 473 of the facility is dangerously high.

The system 600 of FIG. 6 is substantially the same as the system 500 of FIG. 5 and system 400 of FIG. 4, except as described below. Specifically, the system 600 of FIG. 6 shows that the light fixture 402 is coupled to a different sensor 660, which is designed to measure a different condition 693 than the condition 491 of FIGS. 4 and 5. The sensor 660 in this example is disposed in a location 674 of the facility that is different from location 473 of FIGS. 4 and 5. Alternatively, location 674 of FIG. 6 can be the same as location 473 of FIGS. 4 and 5.

The sensor 660 takes a sensor measurement 679 of the condition 693. The condition 693 can be the same as, or different than, the condition 491 of FIGS. 4 and 5. In this case, the condition 693 of FIG. 6 is relative humidity. As a result, in this case, the sensor 660 can be a relative humidity meter that measures the relative humidity in the ambient air of the location 674, and so the sensor measurement 679 can include the amount of relative humidity measured by the sensor 660. In this case, the sensor measurement 679 of FIG. 6 can be 40%.

The sensor 660 sends the sensor measurement 679 to the controller 404 of the light fixture 402 using the communication link 605, which can be the same as, or different than, the communication link 405 of FIGS. 4 and 5. Once the controller 404 of the light fixture 402 receives the sensor measurement 679 from the sensor 660, the controller 404 (more specifically, the control engine of the controller 404) can interpret and evaluate the sensor measurement 679. In this example, the controller 404 determines that the acceptable range of relative humidity in the location 674 of the facility is between and inclusive of 0% and 30%, and so the sensor measurement 679 of 40% is outside the acceptable range.

Once the controller 404 of the light fixture 402 interprets and evaluates the sensor measurement 679, the controller 404 (specifically, the control engine of the controller 404) can control the light output 685 of one or more light sources 442 of the light fixture 402. The controller 404 can control the light output 685 of the light source 442 based on the identification and evaluation of the sensor measurement 679 received from the sensor 660. In this example, the controller 404 directs the light source 442 to emit a light output 685 of a green light that continuously flashes on and off, having intervals of one second being on and one second being off.

The light output 685 of the light source 442 of the light fixture 402 is seen by a user 650, which can be the same as, or different than, the user 460 of FIGS. 4 and 5. The light source 442 that gives off the light output 685 of FIG. 6 can be the same light source 442 or a different light source 442 that provides the light output 483 of FIG. 4 and/or the light output 584 of FIG. 5. If the example of FIG. 6 occurs at substantially the same time as the example of FIG. 5, and if the location 473 is the same as location 674, the controller 404 can use the weighting factors stored in its storage repository to determine how to effectively communicate to a user 650, using the light output of the light sources 642, both the high relative humidity and the high concentration of $H_2S$ in the location 674 of the facility.

For example, one light source 442 of the light fixture 402 can send the light output 584, while another light source 442 of the light fixture 402 can simultaneously send the light output 685. In such a case, the controller 404 can have one light source 442 send the light output 584 in one direction, while having another light source 442 send the light output 685 in a different direction. After 30 seconds, the controller can have each of the two light sources 442 change to send the other light output. As another example, the controller 404 can have a light source 442 send the light output 584 associated with sensor measurement 578 for 15 seconds, then send the light output 685 associated with sensor measurement 679 for the next 15 seconds, and then repeat the process.

In any case described herein, the light output generated by a light source can include any one or more of a number of light characteristics. Such characteristics can include, but are not limited to, hue, saturation, intensity, direction, fading, and mixing. The light output of a light source can be determined by one or more of a number of factors. Examples of such factors can include, but are not limited to, industry standards, manufacturer's settings, default values, and input from a user. For example, in case of the presence of smoke in a facility, light fixtures are used to indicate the most effective evacuation path to an exit. In such a case, example light fixtures can emit the most appropriate spectrum of light (color) under the circumstances to enhance the visibility of the evacuation path.

Figure 7:
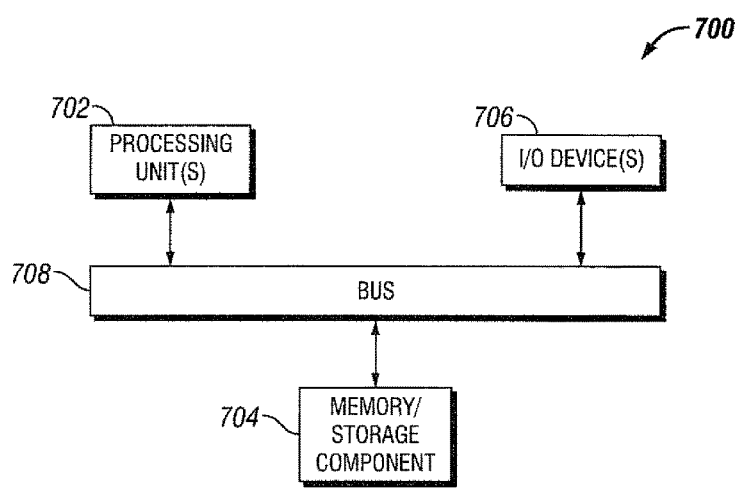
FIG. 7 shows a computing device in accordance with certain example embodiments.

FIG. 7 illustrates one embodiment of a computing device 700 that implements one or more of the various techniques described herein, and which is representative, in whole or in part, of the elements described herein pursuant to certain exemplary embodiments. Computing device 700 is one example of a computing device and is not intended to suggest any limitation as to scope of use or functionality of the computing device and/or its possible architectures. Neither should computing device 700 be interpreted as having any dependency or requirement relating to any one or combination of components illustrated in the example computing device 700.

Computing device 700 includes one or more processors or processing units 702, one or more memory/storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 includes wired and/or wireless buses.

Memory/storage component 704 represents one or more computer storage media. Memory/storage component 704 includes volatile media (such as random access memory (RAM)) and/or nonvolatile media (such as read only memory (ROM), flash memory, optical disks, magnetic disks, and so forth). Memory/storage component 704 includes fixed media (e.g., RAM, ROM, a fixed hard drive, etc.) as well as removable media (e.g., a Flash memory drive, a removable hard drive, an optical disk, and so forth).

One or more I/O devices 706 allow a customer, utility, or other user to enter commands and information to computing device 700, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 700 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 700 includes at least the minimal processing, input, and/or output means necessary to practice one or more embodiments.

Further, those skilled in the art will appreciate that one or more elements of the aforementioned computer device 700 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 8:
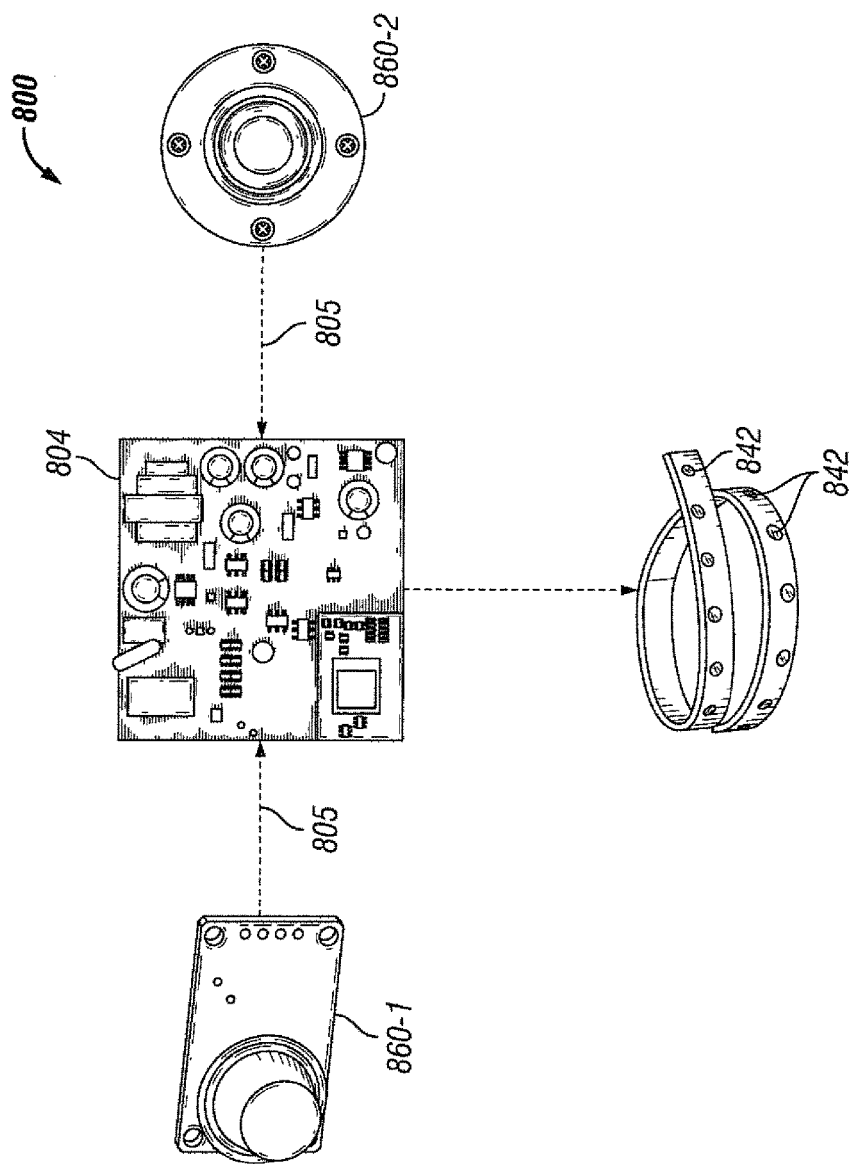
FIG. 8 shows a system that includes a light fixture in accordance with certain example embodiments.

FIG. 8 shows a system 800 in accordance with certain example embodiments. Referring to FIGS. 1-8, the system 800 of FIG. 8 includes a controller 804 that is communicably coupled, using communication links 805, to two sensors 860, sensor 860-1 and sensor 860-2. The controller 804 is also coupled to a number of light sources 842. The controller 804 can be coupled to the light sources 842 using communication links 805. Sensor 860-1 can detect any one or more of a number of parameters (e.g., gas sensor, particle detector). Similarly, sensor 860-2 can detect any one or more of a number of parameters (e.g., occupancy, photocell, temperature, humidity, vibration).

Based on the data received from sensor 860-1 and sensor 860-2, the controller 804 controls the light sources 842. For example, the controller 804 can alter the RGB weighting factor using one or more algorithms, which can change the color, intensity, frequency, and/or other characteristics of the light emitted by the light sources 842. As a specific example, sensor 860-1 can detect a high concentration of $H_2S$ gas and sensor 860-2 can detect movement proximate to where the $H_2S$ gas is detected. When the controller 804 receives this data from sensor 860-1 and 860-2, the controller 804 causes the light emitted by the light sources 842 to change from constant warm white light to flashing red light by half of the light sources 842 and constant bright white light showing a path of egress by the other half of the light sources 842. When sensor 860-2 no longer detects motion, the controller 804 can direct the half of the light sources 842 emitting flashing red light to emit constant red light, and the half of the light sources 842 emitting constant bright white light to emit constant red light.

Figure 9:
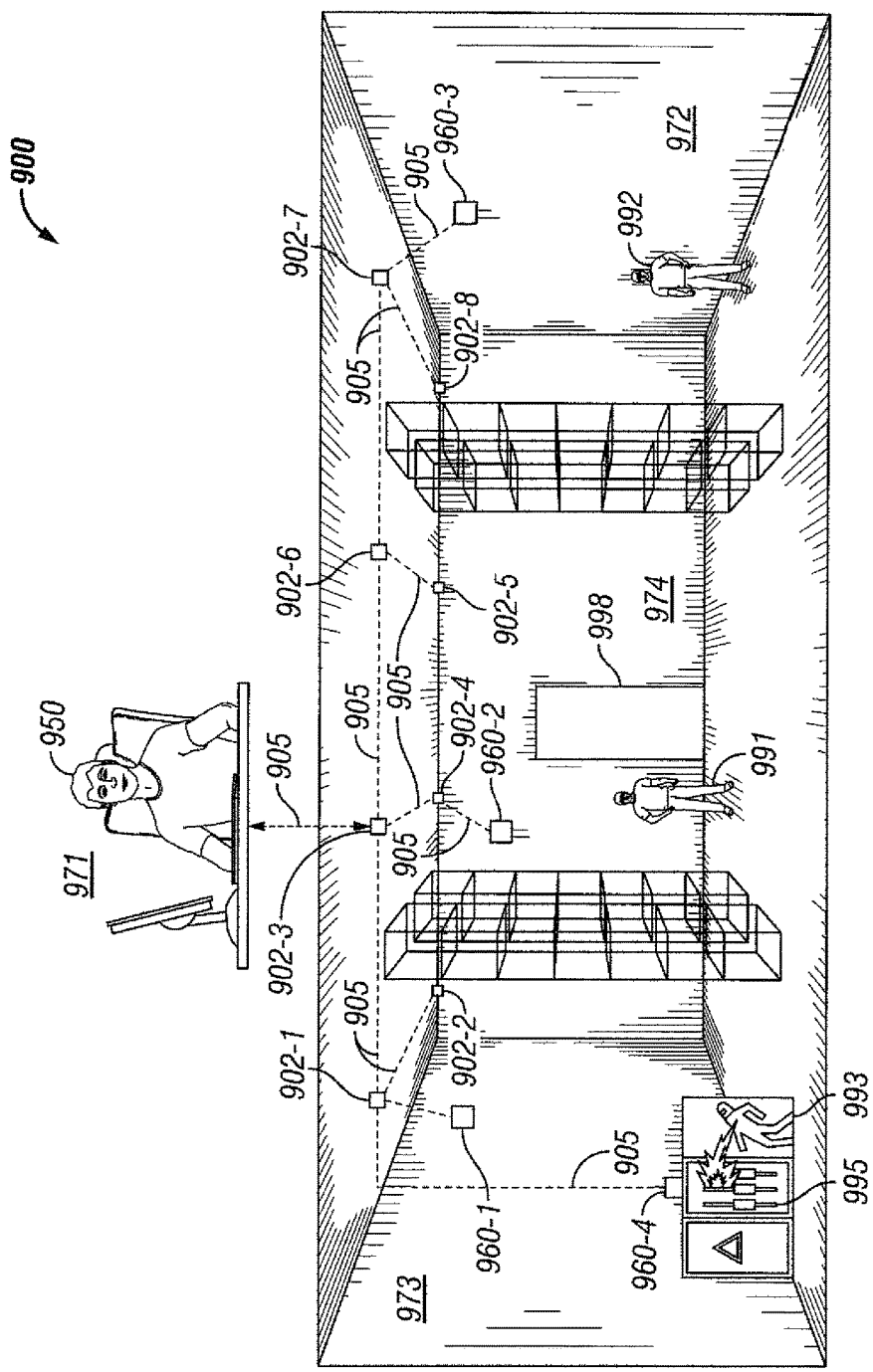
FIG. 9 shows a system with a network of light fixtures in accordance with certain example embodiments.

As discussed above, example embodiments can be configured so that a network of example light fixtures can communicate with each other. FIG. 9 shows a system 900 with a network of light fixtures in accordance with certain example embodiments. Referring to FIGS. 1-9, the system 900 is located in part of a facility that is divided into a number of locations or zones. Location 973 is on the far left and is adjacent to location 974, which itself is adjacent to location 972. Location 971 is remote from the other locations shown in FIG. 9.

Each location in FIG. 9 has a person in it. Specifically, user 950 is in location 971, which can be a control room. Person 993 is in location 973, person 991 is in location 974, and person 992 is in location 972. Aside from location 971, each location also has at least one sensor that is in communication with at least one example light fixture. Specifically, sensor 960-1 and sensor 960-4 are located in location 973 and are communicably coupled, using communication links 905, to light fixture 902-1. In addition to light fixture 902-1, light fixture 902-2 is also located in location 973, where light fixture 902-1 and light fixture 902-2 are communicably coupled to each other using communication links 905.

Sensor 960-2 is located in location 974 and is communicably coupled, using communication links 905, to light fixture 902-4. In addition to light fixture 902-4, light fixture 902-3, light fixture 902-5, and light fixture 902-6 are also located in location 974, where light fixture 902-3, light fixture 902-4, light fixture 902-5, and light fixture 902-6 are communicably coupled to each other using communication links 905. Further, light fixture 902-1 in location 973 and light fixture 902-3 in location 974 are communicably coupled to each other using communication links 905.

Sensor 960-3 is located in location 972 and is communicably coupled, using communication links 905, to light fixture 902-7. In addition to light fixture 902-7, light fixture 902-8 is also located in location 972, where light fixture 902-7 and light fixture 902-8 are communicably coupled to each other using communication links 905. Further, light fixture 902-7 in location 972 and light fixture 902-6 in location 974 are communicably coupled to each other using communication links 905.

In this way, all of the light fixtures 902 shown in the system 900 of FIG. 9 are all directly or indirectly communicably coupled with each other. Further, light fixture 902-3 in location 974 is communicably coupled, using communication links 905, with the user 950 in location 971. Thus, the user 950 is communicably coupled, directly or indirectly, with all of the light fixtures 902 in the system 900 using communication links 905.

In this example, sensor 960-4 detects a fire in an electrical panel 995 in location 973 and communicates this information, using communication links 905, to light fixture 902-1. In addition, sensor 960-1 detects the presence of person 993 in location 973 proximate to the fire in the electrical panel 995 and communicates this information, using communication links 905, to light fixture 902-1. The person 993 detected by sensor 960-1 can be identified generally as a human being or as a specific individual (e.g., John Doe). When the controller of the light fixture 902-1 receives this information, the controller can perform several tasks simultaneously.

For example, the controller can cause the light emitted by half of the light sources of the light fixture 902-1 to emit a flashing red light and the light emitted by the other half of the light sources of the light fixture 902-1 to emit a bright white light showing a path of egress for person 993. As another example, the controller of the light fixture 902-1 can send a signal, using the communication links 905, to the user 950 to inform the user 950 of the fire in location 973 and of the presence of person 993 in the area of the fire in location 973.

As yet another example, the controller of the light fixture 902-1 can send a signal, either generated by the controller or received by the controller from some other component (e.g., the user 950, a controller of another light fixture 902) in the system 900, using the communication links 905, to one or more other light fixtures 902 in any location (e.g., location 973, location 974, location 972) so that the one or more other light fixtures 902 can control the output of the light emitted by the light sources of those light fixtures 902 in a manner appropriate for the events transpiring in location 973. In such a case, the controllers of the other light fixtures 902 can also use the information communicated by light source 902-1 to have their respective light fixture 902 emit light in a certain way based on one or more of a number of factors, including but not limited to the presence of people in a particular location, the quickest path of egress from the fire, the presence of at least one person believed to be in danger, and the location of emergency personnel relative to the fire.

As an example in this particular case, the controller in light fixture 902-1 can inform the controllers in light fixture 902-2 and light fixture 902-4 to emit bright white light to provide a safe path of egress to the nearest exit 998 for person 993 and any other people in location 973. Further, the controller in light fixture 902-7, upon receiving information about the fire from light fixture 902-1, and knowing that person 992 is present in location 972 based on the information provided by sensor 960-3, can cause the light emitted by the light sources of light fixture 902-7 to emit red light (to indicate a fire in a nearby location in the facility). At the same time, the controller in light fixture 902-7 can instruct the controllers in light fixture 902-8 and light fixture 902-5 to emit bright white light to indicate the safest path of egress to the nearest exit 998 for person 992 and any other people in location 972.

In addition, the controllers of light fixture 902-3 and light fixture 902-6, upon receiving information about the fire from light fixture 902-1, and knowing that person 991 is present in location 974 based on the information provided by sensor 960-2, can cause the light emitted by the light sources of light fixture 902-3 and light fixture 902-6 to emit red light (to indicate a fire in a nearby location in the facility). In addition, or in the alternative, the controller of one or more of the light fixtures 902 can inform a person (e.g., person 991, person 992) that someone (in this case, person 993) is in location 973 near the fire and needs assistance. In such a case, the controller of light fixture 902-1 can initiate an emergency response based on information provided by the sensors (in this case, sensor 960-1 and sensor 960-4) in communication with light fixture 902-1.

Example embodiments provide for light fixtures used to communicate, using light output from one or more light sources of a light fixture, one or more environmental conditions at a location of a facility. Such light outputs can be used to communicate normal conditions, a location, conditions that are approaching dangerous levels, special conditions, and dangerous conditions. Some example embodiments do not include the use of sensors to determine the light output of a light fixture. In other example embodiments, a controller of a light fixture communicates with and controls one or more sensors, which can be located within and/or external to the light fixture, within a system. In addition, or in the alternative, a controller of an example light fixture can communicate with and control one or more additional light fixtures 102 in a network. In some cases, example light fixtures can be located in particular environments (e.g., a hazardous environment). In such a case, the light fixture can comply with one or more applicable standards for that environment.

By controlling the sensors, example embodiments can be used to put sensors in sleep mode when they are not in use. Thus, example embodiments can result in lower power usage, as well as more efficient transfer of power and/or control signals to light sources and sensor devices. Communication between the example light fixture and other components (e.g., a user, a sensor, a master controller) of the system can be conducted using wired and/or wireless technology. The example controller described herein can be used with a new light fixture, or can be retrofit into an existing light fixture. Similarly, the example controller described herein can be used with new and/or existing sensors.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A lighting system, comprising:
at least one first light source having a first normal operation mode and a first environmental condition operation mode, wherein the first normal operation mode is associated with a standard emission of light by the at least one light source, and wherein the first environmental condition operation mode is associated with emitting a non-standard emission of light by the at least one light source;
a first controller operatively coupled to the at least one first light source; and
at least one sensor that measures a first parameter of a first environmental condition, wherein the first environmental condition is unassociated with the first normal operation mode of the at least one light source,
wherein the first controller receives first data from the at least one sensor and evaluates the first parameter measured by the at least one sensor,
wherein the first normal operation mode comprises at least one of a first group consisting of steady-state operation of the at least one light source in an on and off state, and steady-state variation of an intensity level of the at least one light source,
wherein the first environmental condition operation mode comprises at least one of a second group consisting of a transient on and off state of the at least one light source, transient changes of the intensity level of the at least one light source, and changes in spectrum of the light output by the at least one light source, and
wherein the first controller, upon determining that the first parameter measured by the at least one sensor falls outside a first range of acceptable values, causes the at least one first light source to emit the non-standard emission of light in the first environmental condition operation mode based on the first data.

2. The lighting system of claim 1, wherein the at least one first light source further has a second environmental condition operation mode, wherein the at least one sensor further measures a second parameter of a second environmental condition, wherein the second environmental condition is unassociated with the first normal operation mode of the at least one first light source, wherein the first controller further receives second data from the at least one sensor and evaluates the second parameter measured by the at least one sensor, and wherein the first controller, upon determining that the second parameter falls outside a second range of acceptable values, changes the at least one first light source to the second environmental condition operation mode based on the second data.

3. The lighting system of claim 1, wherein the at least one first light source emits a first light spectrum during the first normal operation mode, and wherein the at least first one light source emits a second light spectrum during the first environmental condition operation mode.

4. The lighting system of claim 1, wherein the at least one first light source emits a constant emission of light during the first normal operation mode, and wherein the at least one first light source emits an interval emission of the light during the first environmental condition operation mode.

5. The lighting system of claim 1, wherein the at least one sensor is located outside a housing of a light fixture and is intrinsically safe.

6. The lighting system of claim 1, further comprising a housing, wherein the housing meets applicable standards for a hazardous environment.

7. The lighting system of claim 1, wherein the first controller further controls the at least one first light source based on a location of the at least one first light source, wherein the location is assigned a designation by a user, wherein the first environmental condition operation mode of the at least one light source corresponds to the designation.

8. The lighting system of claim 7, further comprising:
at least one second light source having a second normal operation mode and a second environmental condition operation mode; and
a second controller operatively coupled to the at least one second light source and the first controller,
wherein the second controller receives a communication from the first controller, wherein the communication instructs the second controller to operate the at least one second light source from the second normal operation mode to the second environmental condition operation mode,
wherein the communication is based on the first parameter measured by the at least one sensor.

9. The lighting system of claim 7, wherein the at least one first light source comprises a first light source at a first location and a second light source at a second location, wherein the first location of the first light source is proximate to an event that causes the at least one parameter measured by the at least one sensor to fall outside the range of acceptable values, and wherein the second location of the second light source is remote from the event.

10. The lighting system of claim 1, wherein the controller comprises:
a hardware processor;
memory comprising a plurality of instructions;
a control engine that executes the plurality of instructions on the hardware processor, wherein the control engine is configured to control and communicate with the at least one sensor, and
wherein the control engine controls the at least one first light source based on a plurality of detections made by the at least one sensor.

11. The lighting system of claim 1, wherein the at least one sensor is a first sensor among a plurality of sensors, wherein the at least one light source is a first light source among a plurality of light sources, wherein the at least one environmental condition is among a plurality of environmental conditions, wherein a sensor of the plurality of sensors located proximate to an unacceptable environmental condition measures the at least one parameter of the unacceptable environmental condition, wherein the first controller, upon determining that the at least one parameter falls outside the range of acceptable values, controls a light source of the plurality of light sources located closest to the unacceptable environmental condition to operate in the first environmental condition operation mode, wherein the light source is controlled by the first controller based on the unacceptable environmental condition.

12. The lighting system of claim 1, wherein the first environmental condition comprises at least one selected from a group consisting of a gas leak, a fire, an equipment failure, a power outage, an accident, a weather condition, a bird migration season, a turtle hatching season, a presence of wildlife, and a falcon nesting season.

13. The lighting system of claim 1, wherein light emitted by the at least one light source between the first normal operation mode and the first environmental condition operation mode has at least one difference selected from a group consisting of a frequency, a spectrum, and an intensity.

14. A controller of a lighting system, the controller comprising:
memory comprising a plurality of instructions that correspond to detection of at least one environmental condition, wherein the at least one environmental condition is associated with an environmental condition operation mode of the lighting system and is unassociated with a normal operation mode of the lighting system; and
a control engine coupled to the memory, wherein the control engine is configured to:
evaluate at least one parameter associated with the at least one environmental condition measured by at least one sensor;
control, upon determining that the at least one parameter measured by the at least one sensor is within a range of acceptable values, at least one light source of the lighting system to operate in the normal operation mode; and
control, upon determining that the at least one parameter measured by the at least one sensor falls outside the range of acceptable values, the at least one light source to emit a non-standard emission of light in the environmental condition operation mode,
wherein the normal operation mode comprises at least one of a first group consisting of steady-state operation of the at least one light source in an on and off state, and steady-state variation of an intensity level of the at least one light source,
wherein the environmental condition operation mode comprises at least one of a second group consisting of a transient on and off state of the at least one light source, transient changes of the intensity level of the at least one light source, and changes in spectrum of the light output by the at least one light source.

15. The controller of claim 14, wherein the at least one environmental condition comprises a classification of an area in which the at least one light source is disposed, wherein the output of the at least one light source during the normal operation mode designates the classification of the area in which the at least one light source is disposed.

16. The controller of claim 14, wherein the control engine is configured to send and receive communication signals with the at least one sensor based on the plurality of instructions, and wherein the control engine controls the at least one light source between the normal operation mode and the environmental condition operation mode based on a plurality of detections made by the at least one sensor.

17. The controller of claim 14, wherein the at least one light source is part of an existing light fixture, and wherein the control engine is added to the existing light fixture after the existing light fixture is installed.

18. A method for controlling a light source, the method comprising:
operating the light source in a first normal operation mode;
receiving data associated with at least one parameter of an environmental condition measured by at least one sensor, wherein the environmental condition is unassociated with the first normal operation mode of the light source;
evaluating the data;
determining that the at least one parameter measured by the at least one sensor falls outside a range of acceptable values; and
controlling, upon determining that the at least one parameter measured by the at least one sensor falls outside the range of acceptable values, the light source to emit a non-standard emission of light in a first environmental condition operation mode, wherein the first normal operation mode comprises at least one of a first group consisting of steady-state operation of the at least one light source in an on and off state, and steady-state variation of an intensity level of the at least one light source, wherein the first environmental condition operation mode comprises at least one of a second group consisting of a transient on and off state of the at least one light source, transient changes of the intensity level of the at least one light source, and changes in spectrum of the light output by the at least one light source.

19. The method of claim 18, further comprising:
sending, upon determining that the at least one parameter measured by the at least one sensor falls outside the range of acceptable values, instructions to an additional controller, wherein changing the light source from the first normal operation mode to the first environmental condition operation mode is based on a first location of the light source, and wherein the instructions instruct the remote controller to cause an additional light source to change from a second normal operation mode to a second environmental condition operation mode based on a second location of the additional light source.

20. A lighting system comprising:
a plurality of light sources having a normal operation mode and an environmental condition operation mode;
at least one controller operatively coupled to the plurality of light sources; and
a plurality of sensors configured to measure at least one parameter of an environmental condition, wherein the environmental condition is unassociated with the normal operation mode of the plurality of light sources and is associated with the environmental condition operation mode of the plurality of light sources, wherein the at least one controller receives data from the plurality of sensors, wherein the data comprises measurements made by the plurality of sensors, wherein the at least one controller determines that the at least one parameter falls outside a range of acceptable values, wherein the at least one controller, based on determining that the at least one parameter falls outside the range of acceptable values, controls the plurality of light sources to emit a non-standard emission of light in the environmental condition operation mode, wherein the normal operation mode comprises at least one of a first group consisting of steady-state operation of the at least one light source in an on and off state, and steady-state variation of an intensity level of the at least one light source, wherein the environmental condition operation mode comprises at least one of a second group consisting of a transient on and off state of the at least one light source, transient changes of the intensity level of the at least one light source, and changes in spectrum of the light output by the at least one light source.

* * * * *